(12) United States Patent
Ackerman et al.

(10) Patent No.: US 12,217,756 B2
(45) Date of Patent: Feb. 4, 2025

(54) SYSTEMS AND METHODS FOR IMPROVED DIGITAL TRANSCRIPT CREATION USING AUTOMATED SPEECH RECOGNITION

(71) Applicant: Magna Legal Services, LLC, Philadelphia, PA (US)

(72) Inventors: Robert Ackerman, Boca Raton, FL (US); Anthony J. Vaglica, Silver Spring, MD (US); Holli Goldman, Richboro, PA (US); Amber Hickman, Swedesboro, NJ (US); Walter Barrett, Gibbsboro, NJ (US); Cameron Turner, Palo Alto, CA (US); Shawn Rutledge, Seattle, WA (US)

(73) Assignee: AUDAX PRIVATE DEBT LLC, Boston, MA (US)

( * ) Notice: Subject to any disclaimer, the term of this patent is extended or adjusted under 35 U.S.C. 154(b) by 570 days.

(21) Appl. No.: 17/465,509

(22) Filed: Sep. 2, 2021

(65) Prior Publication Data
US 2022/0059096 A1     Feb. 24, 2022

Related U.S. Application Data

(63) Continuation of application No. 16/570,699, filed on Sep. 13, 2019, now abandoned.
(Continued)

(51) Int. Cl.
*G10L 15/26* (2006.01)
*G06F 17/18* (2006.01)
*G06V 40/16* (2022.01)

(52) U.S. Cl.
CPC .............. *G10L 15/26* (2013.01); *G06F 17/18* (2013.01); *G06V 40/172* (2022.01)

(58) Field of Classification Search
CPC .......... G10L 15/00; G10L 15/26; G10L 25/57
See application file for complete search history.

(56) References Cited

U.S. PATENT DOCUMENTS 6,332,122 B1    12/2001    Ortega et al.
6,424,946 B1    7/2002    Tritschler et al.
(Continued)

OTHER PUBLICATIONS

Kempter, Renato, et al. "EmotionWatch: Visualizing fine-grained emotions in event-related tweets." Proceedings of the international AAAI conference on web and social media. vol. 8. No. 1. 2014.*
(Continued)

*Primary Examiner* — Paras D Shah
(74) *Attorney, Agent, or Firm* — FINNEGAN, HENDERSON, FARABOW, GARRETT & DUNNER LLP

(57) ABSTRACT

This disclosure relates generally to systems, methods, and computer readable media for providing improved insights and annotations to enhance recorded audio, video, and/or written transcriptions of testimony. For example, in some embodiments, a method is disclosed for correlating non-verbal cues recognized from an audio and/or video recording of testimony to the corresponding testimony transcript locations. In other embodiments, a method is disclosed for providing testimony-specific artificial intelligence-based insights and annotations to a testimony transcript, e.g., based on the use of machine learning, natural language processing, and/or other techniques. In still other embodiments, a method is disclosed for providing smart citations to a testimony transcript, e.g., which track the location of semantic constructs within the transcript over the course of various modifications being made to the transcript. In yet other embodiments, a method is disclosed for providing intelligent speaker identification-related insights and annotations to an audio recording of a testimony transcript.

17 Claims, 10 Drawing Sheets

Related U.S. Application Data

(60) Provisional application No. 62/730,700, filed on Sep. 13, 2018.

(56) References Cited

U.S. PATENT DOCUMENTS

| | | | |
|---|---|---|---|
| 9,990,926 B1 | 6/2018 | Pearce | |
| 10,178,301 B1 | 1/2019 | Welbourne et al. | |
| 10,304,458 B1 | 5/2019 | Woo | |
| 2005/0086226 A1* | 4/2005 | Krachman | G06Q 50/16 |
| 2006/0149558 A1* | 7/2006 | Kahn | G10L 15/063 |
| | | | 704/278 |
| 2007/0260457 A1* | 11/2007 | Bennett | G11B 27/10 |
| | | | 704/E15.005 |
| 2009/0037171 A1* | 2/2009 | McFarland | G10L 15/26 |
| | | | 704/235 |
| 2009/0094029 A1 | 4/2009 | Koch et al. | |
| 2009/0276215 A1 | 11/2009 | Hager | |
| 2012/0011085 A1 | 1/2012 | Kocks et al. | |
| 2016/0004679 A1* | 1/2016 | Grimm | G06F 40/20 |
| | | | 715/753 |
| 2016/0148043 A1* | 5/2016 | Bathiche | H04N 7/147 |
| | | | 382/118 |
| 2016/0260435 A1 | 9/2016 | Baard et al. | |
| 2018/0174587 A1 | 6/2018 | Bermundo | |
| 2018/0197548 A1 | 7/2018 | Palakodety et al. | |
| 2018/0268305 A1* | 9/2018 | Dhondse | G06N 5/04 |
| 2018/0293221 A1 | 10/2018 | Finkelstein et al. | |
| 2018/0315249 A1 | 11/2018 | Suto et al. | |
| 2018/0315429 A1* | 11/2018 | Taple | G10L 17/24 |
| 2018/0358034 A1 | 12/2018 | Chakra et al. | |
| 2019/0132265 A1 | 5/2019 | Nowak-Przygodzki et al. | |

OTHER PUBLICATIONS

Robinson, Raquel, et al. "All the feels: designing a tool that reveals streamers' biometrics to spectators." Proceedings of the 12th International Conference on the Foundations of Digital Games. 2017.*

* cited by examiner

SYSTEMS AND METHODS FOR IMPROVED DIGITAL TRANSCRIPT CREATION USING AUTOMATED SPEECH RECOGNITION

TECHNICAL FIELD

This disclosure relates generally to systems, methods, and computer readable media for providing improved insights and annotations for recorded audio, video, and/or written transcriptions of testimony.

BACKGROUND

For years, court reporters have provided legal support services, including testimony transcription services, to the nation's top law firms, corporations, and governmental agencies. Traditionally, a human court reporter uses a specialized stenography machine, which is today connected to a computer running a specialized transcription application, to transcribe spoken testimony. As the court reporter transcribes the testimony that he or she is hearing in shorthand via the stenography machine, the shorthand version of the text is converted on-the-fly into plain English. This first pass at the transcription is commonly referred to as "the rough." After the testimony has concluded, e.g., hours later or days later, the court reporter (or another entity) edits "the rough" file for clarity and/or to make any corrections noted at the time of the testimony or during the editing process. Once the transcript is in an acceptable format, the file is typically exported to a more widely-usable format, e.g., an ASCII text format. Later, e.g., in a post-production phase, corresponding audio and/or video files may be produced and synched to the transcript text, and multiple versions of the transcript text may be provided, based on a given client's needs (e.g., 1-page per letter page, 2-pages per letter page, 4-pages per letter page, etc.), e.g., in PDF, ASCII, a word processing document format, or other desired format.

One issue with this traditional model of transcription is the difficulty human beings have in being able to transcribe spoken words accurately at the typical rate of spoken testimony. Moreover, legal proceedings typically may involve many proper nouns, names and locations, and complex medical, legal, financial or technical terms. Another issue is the availability of human court reporters with sufficient skill to serve as transcribers in live testimony settings. For example, studies have shown that there is nearly a 98% dropout rate from court reporting school, and, in 2017, only 275 people graduated from stenographic court reporting schools in the United States, as many human court reporters become overwhelmed with the amount of practice required and the typical typing speeds needed to work in the field (e.g., between 200-250 words per minute). Also, typically, a 96% accuracy rate in transcription is required, with the remaining parts corrected for and filled in during a "scoping" process, as will be described in more detail later.

Thus, in the future, it is likely that human court reporters will need to be aided (to a significant extent) by intelligent machine labor. The subject matter of the present disclosure is directed to overcoming, or at least reducing the effects of, one or more of the problems set forth above. To address these and other issues, techniques that enable an AI-powered transcription system, e.g., that leverages data mining, pattern recognition, and natural language processing techniques, and has the ability to provide improved insights and annotations for recorded audio, video, and/or written transcriptions of testimony are described herein. Such systems may also ultimately hold the promise to extract deeper (and more valuable) inferences from testimony transcripts than merely the words that were spoken during the live testimony.

SUMMARY

According to some embodiments described herein, a method is disclosed, comprising: obtaining an audio and/or video recording of a testimony; obtaining a transcript of the testimony; scanning the audio and/or video recording to locate one or more emotional or non-verbal cues; linking the located one or more emotional or non-verbal cues to corresponding portions of the transcript; and updating the corresponding portions of the transcript with indications of the corresponding located one or more emotional or non-verbal cues.

According to other embodiments, a method is disclosed, comprising: obtaining a transcript of a testimony; analyzing the transcript using one or more artificial intelligence (AI)-based techniques; detecting one or more logical inconsistencies in the transcript based, at least in part, on the analysis of the transcript; detecting one or more potential transcription errors in the transcript based, at least in part, on the analysis of the transcript; and updating the corresponding portions of the transcript with indications of the corresponding detected one or more logical inconsistencies and one or more potential transcription errors.

According to still other embodiments, a method is disclosed, comprising: obtaining a transcript of a testimony; identifying one or more semantic constructs in the transcript; tagging each of the one or more semantic constructs with a unique token identifier; associating a current position of each of the one or more semantic constructs with its unique token identifier; receiving one or more updates to the transcript; and updating one or more of the associated positions of one or more of the one or more semantic constructs based on the received one or more updates to the transcript.

According to yet other embodiments, a method is disclosed, comprising: obtaining a first audio recording of a first testimony, wherein the first audio recording comprises one or more first speaking parties; tagging the obtained first audio recording with one or more unique speaker identifiers, wherein each of the one or more unique speaker identifier corresponds to one of the one or more first speaking parties; determining at least one characteristic of the tagged obtained first audio recording; storing the tagged obtained first audio recording and corresponding at least one determined characteristic in a repository; obtaining a second audio recording of a second testimony, wherein the second audio recording comprises one or more second speaking parties; comparing the obtained second audio recording to one or more audio recordings stored in the repository; and in response to finding at least one matching audio recording in the repository, updating the obtained second audio recording with one or more speaker cues, wherein the one or more speaker cues are based, at least in part, on the at least one matching audio recording in the repository.

Various programmable electronic devices are disclosed herein as well, in accordance with the method embodiments enumerated above. Such electronic devices may include a display; a user interface; one or more processors; and a memory coupled to the one or more processors. Instructions may be stored in the memory, the instructions causing the one or more processors to execute instructions in accordance with the various method embodiments enumerated above. According to other embodiments, instructions may be stored on non-transitory program storage devices for causing one or more processors to execute instructions in accordance with the various method embodiments enumerated above.

DETAILED DESCRIPTION

Disclosed are systems, methods, and computer readable media for providing improved insights and annotations to enhance recorded audio, video, and/or written transcriptions of testimony, e.g., testimony that has been obtained, at least in part, via the use of automated speech recognition (ASR) technologies. Transcripts, as used herein, may refer to a result of transcribing legal testimony (e.g., in a deposition or courtroom setting), or any other spoken words in any context for which there is a desire to have an audio, video, and/or written transcription. For example, in some embodiments, a method is disclosed for correlating non-verbal cues recognized from an audio and/or video recording of a testimony to the corresponding testimony transcript locations. In other embodiments, a method is disclosed for providing testimony-specific artificial intelligence (AI)-based insights and annotations to a testimony transcript, e.g., based on the use of machine learning, natural language processing, and/or other techniques. In still other embodiments, a method is disclosed for providing smart citations to a testimony transcript, e.g., which track the location of semantic constructs within the transcript over the course of various modifications being made to the transcript. In yet other embodiments, a method is disclosed for providing intelligent speaker identification-related insights and annotations to an audio recording of a testimony transcript.

Figure 1:
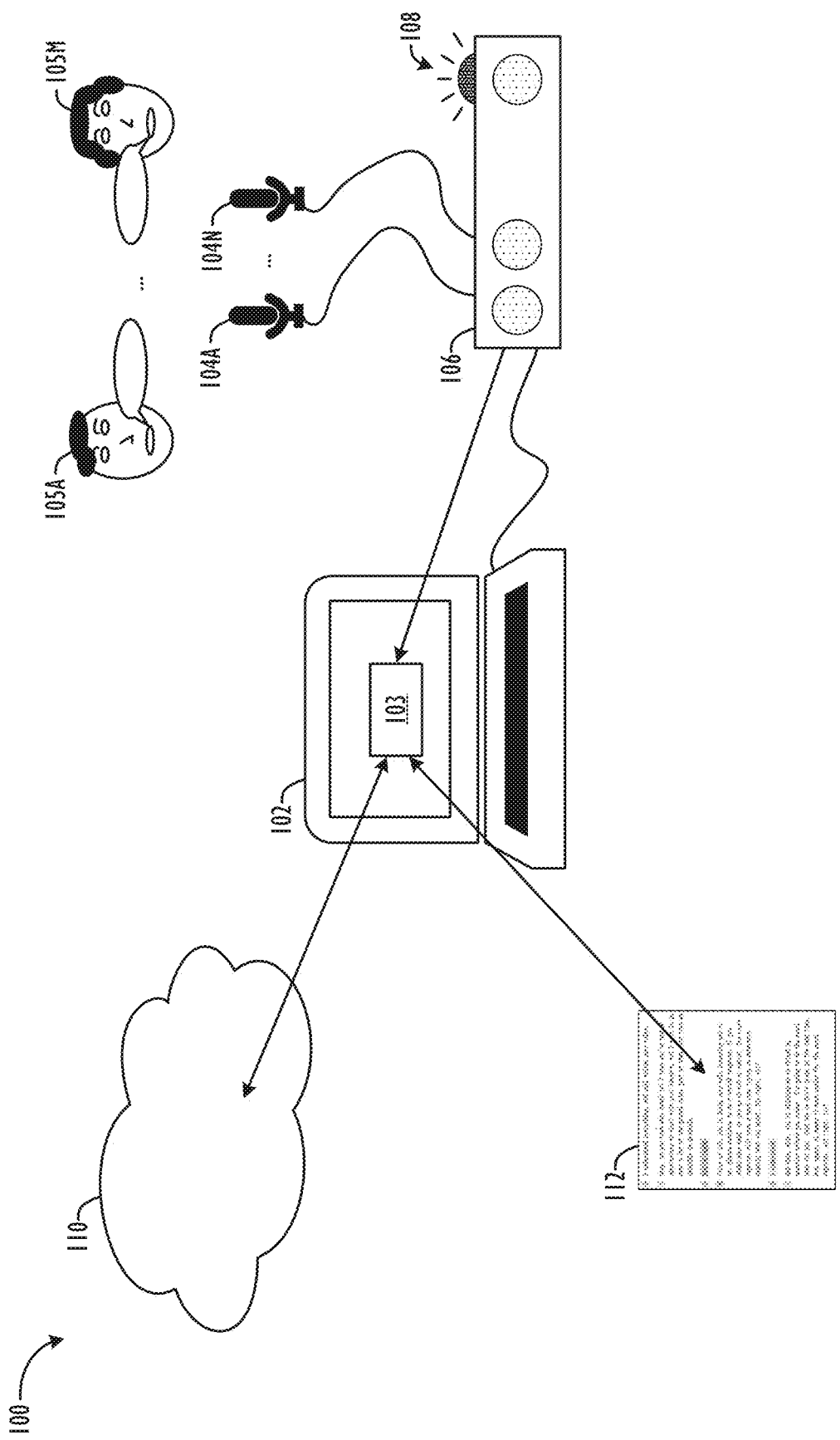
FIG. 1 is a diagram illustrating an exemplary digital court reporting (DCR) system, according to one or more disclosed embodiments.

Referring now to FIG. 1, a diagram 100, illustrating an exemplary digital court reporting (DCR) system, is shown, according to one or more disclosed embodiments. The system may comprise one or more computing devices, e.g., laptop 102, as shown in FIG. 1. Computing device 102 may be operated by a human court reporter who is, e.g., transcribing or otherwise in charge of obtaining a rough transcript for a given testimony. It is to be understood that, in other embodiments, computing device 102 may comprise other types of computing devices, such as a desktop computer, tablet computer, mobile device, wearable device, etc.

Computing device 102 may be executing one or more instances of improved digital court reporting software 103. Software 103 may provide 'standard' court reporting functionality, as well as the ability to provide one or more improved insights and annotations for audio/video recorded and/or written transcriptions, which will be discussed in greater detail below with regard to FIGS. 3, 4, 5, and 6. In addition to the aforementioned improved insight and annotation capabilities, according to some embodiments, court reporting software 103 may further provide one or more of the following exemplary features.

Exemplary Features of an Improved DCR System

Improved DCR systems may alter (and improve upon) the state of the art of transcript and the court reporting industry by enabling users of such documents the ability to easily look across various transcript artifacts and compare by sub-document level entities. For example, a user may wish to compare testimony across proceedings by the same speaker, by topic, by attendees, and/or by date/time. The Improved DCR systems may not only be able to identify these relationships, but can also offer probability-based insights and recommendations, for example, expert witnesses who have a similar set of expertise based on the language used during a given testimony may be suggested or recommended as potential experts for the given lawsuit or proceeding. Additional features extracted from the audio and/or video of recorded proceedings may be leveraged to assign certain non-verbal cues to portions of the testimony, as will be described in greater detail below. Other features of interest in improved DCR systems may include the following:

Timestamps: Having timestamps for each word lets an editor synchronize to particular audio portions of the transcript if there is a desire to re-listen to a portion. Timestamps also allow playback applications to play the audio in sync with the transcription text.

Word Alternatives: Word alternatives are second or third choice words for what the system may have initially determined was spoken during live testimony. An application could provide these word alternatives as drop downs or accept them through some other form of user feedback.

Confidence Scores: Scores that show how confident the system was in each transcribed word result and is another source of potential feedback to the user.

Smart Formatting: Formatting that may include recognizing and formatting dates, times, series of digits and numbers, phone numbers, currency values, and internet addresses, as well as capitalizing many proper nouns and recognizing sentence starts and ends.

Other Features: Other features that may be desirable in DCR systems may include, e.g.: video captioning, text search, keyword spotting, topic identification, vocabulary customization, and real-time transcribing. Within a single transcript, and/or over time with many transcripts, custom dictionaries and word ontologies (i.e., data structures describing the relationship between words) may be built to improve speech recognition accuracy and add context to the transcriptions.

According to some embodiments, computing device 102 may be in communication with processing resources hosted via a remote server, e.g., a cloud service provider 110, in real-time during testimony (or after live testimony has concluded), for the provision of various ASR transcription services. In recent years, the accuracy rates of real-time cloud transcription services have increased to the point where they are typically reliable enough to provide a first rough pass of testimony for a testimony transcript. Moreover, according to some embodiments, an improved DCR system may be designed with sufficient flexibility, such that it could interchangeably access and utilize the APIs of different cloud service providers. For example, in some instances, a highest quality transcription provider may be desired, whereas, in other instances, a lowest cost provider of cloud transcription services may be desired. In still other embodiments, the real-time ASR transcription services may be provided by computing device 102 itself, i.e., even if there is no access to remote ASR transcription resources.

As illustrated in FIG. 1, DCR system 100 may further comprise one or more microphones 104 or other audio recording equipment. In some embodiments, there may be up to 'N' microphones (i.e., 104A . . . 104N, as shown in FIG. 1), which may be used to capture audio from up to 'M' speaking parties 105 (i.e., 105A . . . 105M, as shown in FIG. 1). The numbers of N and M need not necessarily be the same, and the N microphones need not be assigned individually, i.e., on a one-to-one basis with potential speaking parties, but may be instead distributed around the environment where the testimony is taking place (e.g., a court room, board room, meeting room, or office setting).

DCR system 100 may further comprise one or more multi-channel external sound interfaces 106. In some embodiments, the sound interface 106 may connect to computing device 102 via a USB interface or other desired interface for data exchange (e.g., any wired or wireless data communication interface). In still other embodiments, the sound interface 106 may be integrated into computing device 102. One role of sound interface 106 is to receive the recorded audio from microphones 104 and transmit the audio to computing device 102, so that the court reporting software 103 (or later, e.g., via production tools 208) may mix, edit, synchronize and/or encode the recorded audio for production to a client, e.g., in conjunction with a final testimony transcript file. The recorded audio may comprise 1, 2, 4, 8, or N channels of audio.

In other embodiments, the sound interface 106 may further comprise one or more indicator lights 108. For example, indicator lights 108 may comprise one or more uni-colored or multi-colored LED lights. In such embodiments, the indicator lights may be used to indicate various conditions during the testimony, e.g., a green light to indicate 'on-record' and a red light to indicate 'off-record;' an assignment of different light colors to signify different active speakers (e.g., as determined via which microphone 104 is currently capturing audio and/or by other more intelligent speaker detection techniques, which will be described in further detail below with reference to FIG. 6); a light color to indicate volume levels being too quiet or too loud; a light color to indicate multiple parties speaking at once, etc. The status of the indicator light 108 may also be encoded along with the final transcript, so that a user could, e.g., via the use of specialized transcript viewing software, see an indication of the status of the indicator light(s) during the playback of the corresponding portions of the video and/or audio recordings of the testimony.

It is to be understood that microphone devices 104 may also be part of (e.g., integrated into) a video recording device (not shown in FIG. 1) that is being used to capture a video recording of the testimony. In still other embodiments, the microphone devices 104 may be external to the video recording devices being used to capture the video recording of the testimony.

Ultimately, the court reporting software 103 may produce a testimony transcript file 112. As will be explained in greater detail below, e.g., with reference to FIG. 2, the initial production of the testimony transcript file may be a rough draft raw transcript, subject to future revisions and refinements by various participants in the digital court reporting system process. Likewise, the various improved insight and annotation capabilities mentioned above, as well as the various exemplary features of an improved DCR system mentioned above, may be incorporated into the transcript file 112: in real-time; after the production of the rough draft raw transcript; and/or later in the transcript production process (e.g., in post-production). The set of particular insights, annotations, and/or features to be incorporated into a given transcript file 112 will depend on the requirements of a particular client.

Figure 2:
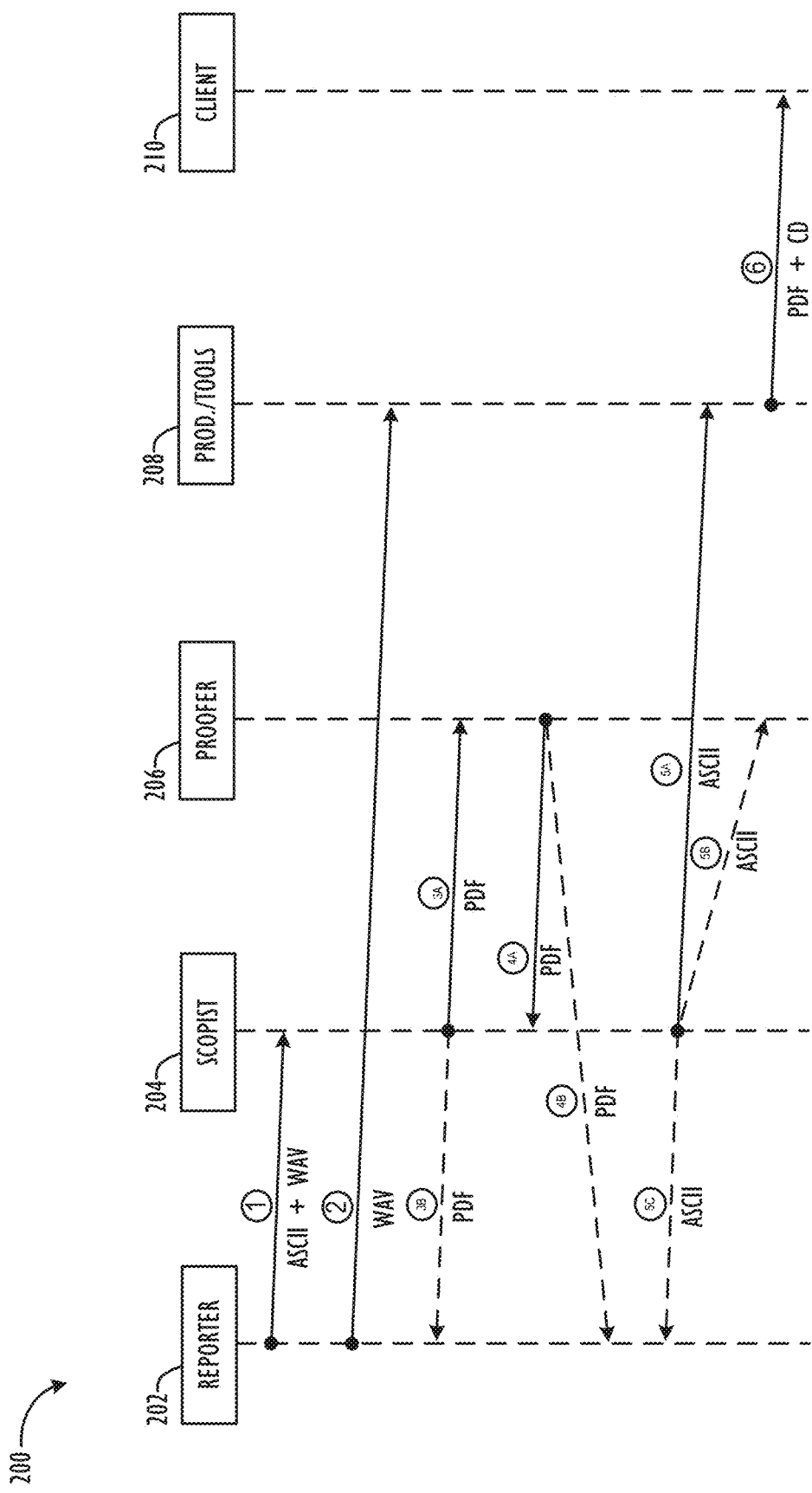
FIG. 2 is a flow diagram illustrating interactions between various participants in a digital court reporting system, according to one or more disclosed embodiments.

Referring now to FIG. 2, a flow diagram 200 illustrating interactions between various participants in a digital court reporting system is shown, according to one or more disclosed embodiments. As will be described in further detail below, the various participants in the production of an annotated testimony transcripts, according to some embodiments disclosed herein, may comprise: a Court Reporter (202); a "Scopist" (204); a Proofer (206); a Producer/set of Production Tools (208); and a Client (210). [It is to be understood that the chosen example described in FIG. 2 is related to courtroom testimony context, but the same teachings and roles could be applied equally in contexts outside of the courtroom.]

Court Reporter (202): The role of a Court Reporter (202) may be to use a digital court reporting system (e.g., computing system 102 executing software 103) to create an initial rough draft raw transcript of a testimony. The raw transcript may be created in ASCII format (e.g., free from the particular formatting requirements that may be present in a final draft transcript) and be utilized for editing purposes only. The transcript may be created via the reporter manually typing within software as the proceedings are ongoing, and/or be aided by real-time speech-to-text recognition software and/or services (e.g., cloud-based ASR and transcription services), as will be discussed in greater detail herein. As a representative of the Court, the Reporter 202 may also be responsible for performing one or more of the following tasks: making real-time edits to the transcript, marking known errors in the transcript; making manual speaker assignments, managing the swearing in of deponents, managing annotations of the proceedings going on-/off-record, inserting annotations to mark where particular sections of the testimony begin or end (e.g., recess, exhibits, etc.), keeping a list of fixes to make after the real-time testimony concludes, and making manual/automatic adjustments or edits to the transcript as needed. At the conclusion of creating the draft raw transcript of the testimony, Reporter 202 may then send ASCII and/or audio files (e.g., a .wav audio file, as will be described in greater detail below) to Scopist 204, as shown by arrow 1 in FIG. 2. In some scenarios, Reporter 202 and Scopist 204 may actually be the same person, meaning the raw transcript may not actually need to leave the reporter's computing device as part of this step. Simultaneously, or subsequently, Reporter 202 may also send the audio files to a producer/production tools (208) for a final audio processing step(s) (as shown by arrow 2 in FIG. 2), e.g., to encode the audio into a different format, edit or trim the audio, boost the audio, tag portions of the audio, etc.

Scopist (204): Upon receipt of the raw draft from Reporter 202, Scopist 204 may use one or more software tools to create a proofable draft transcript of the testimony. Scopist 204 may also be responsible for performing one or more of the following tasks: applying state-specific templates to the transcript (e.g., related to jurisdiction-specific requirements for indentation, margins, header/footers, fonts, line spacing, numbering, etc.); playing back the audio file to make changes as needed; converting any shortened annotations of text to the full version of the word(s); adding one or more of: a cover page, appearance page, exhibits page, certification page, line numbering; performing any global (e.g., find/replace) edits; and performing any spell checking and/or grammar checking. At the conclusion of performing these tasks, Scopist 204 may then send a PDF of the transcript to a Proofer (206) (optionally copying Reporter 202), as shown by arrows 3A and 3B in FIG. 2, respectively.

Proofer (206): Proofer 206 may use one or more software tools to mark-up the transcript document. Proofer 206 may also be responsible for performing one or more of the following tasks: highlighting errors in the text; and adding comments and/or suggested edits where errors or potential errors are located. At the conclusion of performing these tasks, Proofer 206 may send an annotated PDF file of the transcript back to Scopist 204 for any further edits (as shown by arrow 4A in FIG. 2) and may also optionally copy Reporter 202 (as shown by arrow 4B in FIG. 2), who may agree, disagree, and/or comment further as to the various proposed changes and annotations made to the transcript.

Scopist (204): At this stage, Scopist 204 may make final updates to the transcript and add any necessary certifications/notarizations to the transcript file. At the conclusion of performing these tasks, Scopist 204 may send an ASCII file version of the final transcript to producer/production tools 208 (as shown by arrow 5A in FIG. 2) and may also optionally copy Proofer 206 (as shown by arrow 5B in FIG. 2) and Reporter 202 (as shown by arrow 5C in FIG. 2).

Producer/Production Tools (208): A producer may then use various tools to produce a final PDF version of the transcript, which may involve adding any final formatting, logos, outlines, etc. to the transcript. Producer 208 may also be responsible for performing one or more of the following tasks: generating an .SMI file for video synchronization; generating a PDF and/or CD/DVD for the client 210 (as shown by arrow 6 in FIG. 2); creating alternate versions of the transcript (e.g., 4-pages/sheet "Minis," etc.); and editing the audio file, if one is to be included with the final package sent to the client.

According to some embodiments described herein, the various improved insights and annotations for recorded audio/video and/or written transcriptions may be applied by the production tools 208, before the final package is sent to the client. According to other embodiments, however, it may also be possible to apply the various improved insights and annotations to the transcriptions in real-time or near real-time, e.g., saving the annotations along with the transcription file (e.g., in a JSON object). In still other embodiments, early versions of the ASR output may be provided a client in "rough" format, i.e., in real-time or near real-time, e.g., via a networked connection to the laptops or other computing devices of the various participants in the room where the testimony is taking place.

Figure 3A:
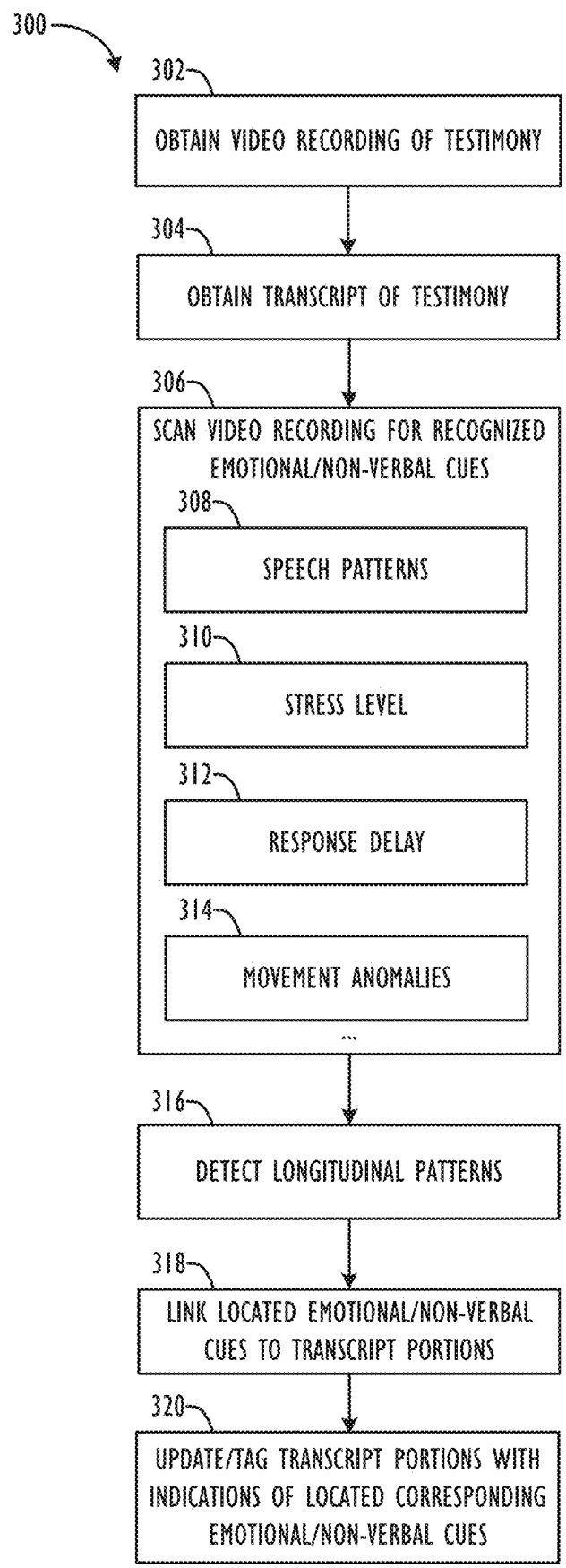
FIG. 3A is a flowchart showing a method for correlating non-verbal cues to a testimony transcript, according to one or more disclosed embodiments.

Referring now to FIG. 3A, a flowchart 300 showing a method for correlating non-verbal cues to an audio and/or video testimony transcript is shown, according to one or more disclosed embodiments. As alluded to above, some embodiments of an improved digital court reporting system may generate and provide indications of the presence and/or timing/location within a transcript of various potentially-relevant non-verbal cues. Such insights may be provided by a user's (e.g., a court reporter) computing device in real-time during testimony (or after live testimony has concluded) and/or leverage processing resources hosted via a remote server, e.g., a cloud storage service provider, in real-time during testimony (or after live testimony has concluded).

Thus, according to some embodiments, the method may begin at Step 302 by obtaining a video recording of a testimony. (It is to be understood that, according to the various embodiments disclosed throughout this document, the audio and/or video recordings of testimony may be received in a streaming 'real-time' fashion and/or as a complete file, e.g., after the testimony has already concluded.) Next, at Step 304, the process may obtain a textual transcript of the testimony (e.g., in accordance with the exemplary process flow outlined with reference to FIG. 2, above). Next, the process may scan the obtained video recording and analyze it to recognize various potentially-relevant non-verbal, e.g., emotional, cues (Step 306). Examples of non-verbal cues that the system may be trained to recognize include: speech patterns 308 (e.g., speech patterns indicative of truthfulness, honestly, confidence, believability, etc.); stress levels 310 (e.g., speech and/or activity patterns indicative of aggravation, anger, confusion, increased volume levels, hesitations, etc.); response delays 312 (e.g., the amount of time elapsed between the conclusion of a question to a deponent and the beginning and/or conclusion of the deponent's response); and/or movement anomalies 314 (e.g., activity patterns that deviate from the deponent's normal movements, as may be established by the remainder of the video recording and/or other video recordings of the same deponent, abnormal fidgeting, body language cues, such as eye contact and posture, and/or looking in a particular direction, such as in the direction of the deponent's counsel, etc.). Improved DCR systems according to the embodiments disclosed herein may be trained to recognize attributes indicative of these various non-verbal cues using any number of AI-based technologies, e.g., the use of machine-learning and deep learning through artificial neural networks (ANNs), using labeled data to identify future instances of similar behavior. This so-called "supervised learning" context enables the system to be continuously trained thereby gaining new insights and labels over time.

To further enhance the insights gained at Step 306, according to some embodiments, longitudinal patterns in the deponent's testimony may also be detected (Step 316), e.g., by comparing the testimony in the obtained transcript to other testimony given by the same witness at different points in time and/or in different transcripts the system has access to. This longitudinal analysis may reveal certain emotional and/or non-verbal cues used by the testifying party in past testimony, as well as how such cues may have correlated to the of truthfulness, honestly, confidence, believability, etc. of the corresponding past testimony. Information obtained from the detection of longitudinal patterns in a deponent's testimony may then be used to further update/annotate any located potentially-relevant non-verbal cues in the presently analyzed testimony (and/or similar portions of other transcripts, e.g., other transcripts of the same deponent).

Next, at Step 318, any located potentially-relevant non-verbal cues may be linked to the corresponding portions of the presently analyzed testimony (and/or similar portions of other transcripts, e.g., other transcripts of the same deponent). For example, in the case of a textual testimony transcript (e.g., in ASCII or PDF formats), the relevant pages/lines where a deponent exhibited a particular non-verbal cue, e.g., an unusual response delay, may each be associated with the corresponding non-verbal cue from the testimony. In the case of a video testimony transcripts, the begin/end timestamps of the particular non-verbal cue, for example, may be associated with each corresponding non-verbal cue. Finally, the process may update and/or tag the relevant portions of the relevant transcripts with indications of the corresponding identified non-verbal cues (Step 320). The tagging process may comprise adding the tag into a metadata portion of the transcript document or recording, and/or making a visual annotation directly into the transcript document (e.g., via bolding, underlining, highlighting, annotation, overlaying, or other emphasis techniques). These attributes may be individualized by participant based on their own personal ranges of response within a single attribute (i.e. percentile based vs. absolute values).

Figure 3B:
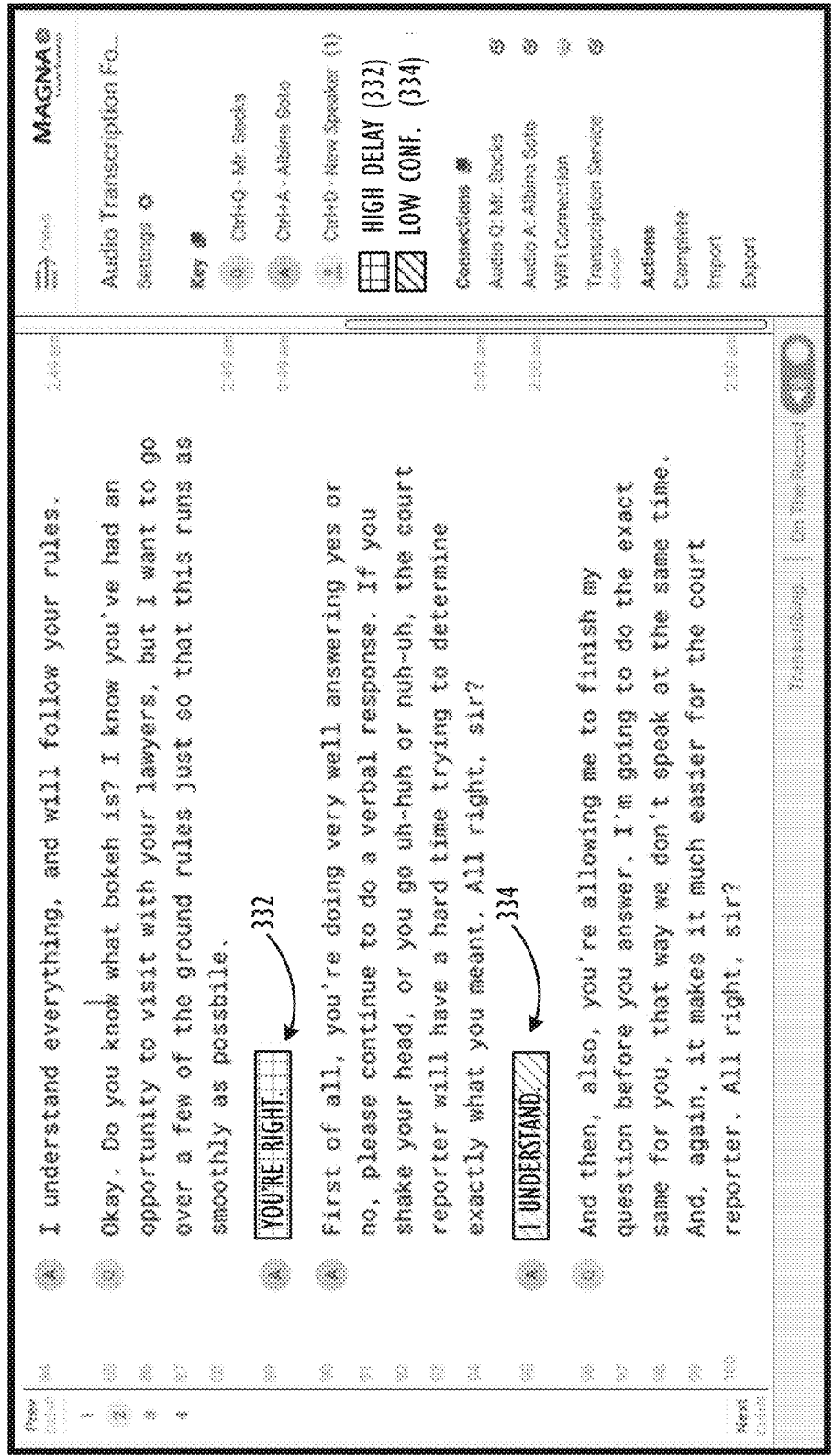
FIG. 3B shows an example of improved insights and annotations to a testimony transcript, according to one or more disclosed embodiments.

Referring now to FIG. 3B, an example 330 of improved insights and annotations to a testimony transcript is shown, according to one or more disclosed embodiments. Example 330 may comprise an exemplary screen shot from an improved digital court reporter system (e.g., as produced on computing system 102 executing software 103 in FIG. 1). In addition to the traditional transcript components shown in example 330, such as page/line numbers, speaker indication, written testimony, timestamps, and various other UI indications of available features and functionality, the example 330 testimony transcripts includes various exemplary improved insights and annotations, e.g., a high response delay indicator flag (332) and a low confidence indicator flag (334).

In the example 330 shown, corresponding testimony wherein the deponent has exhibited a high response delay has been highlighted using the square-hatched pattern 332. (It is to be understood that, in a given implementation, any desired highlighting or indication could be used to denote the relevance of a particular portion of the testimony transcript, e.g., colored-highlighting, colored text, font variance, graphical badging, etc.) In this case, the deponent has exhibited an unusually high amount of delay before responding "You're Right" at line 89. This may be an indication to a reviewing attorney that, e.g., the deponent was less believable when giving this particular response than he or she was when giving a normal response during this testimony (or past testimony). Likewise, corresponding testimony wherein the deponent has exhibited a low confidence level (e.g., as determined by one or more emotional detection classifiers, neural networks, etc., that have been used to analyze the obtained video recording of the testimony) has been highlighted using the diagonally-hatched pattern 334. In this case, the deponent has exhibited low confidence in his or her response of "I understand" at line 95. This may be an indication to a reviewing attorney that, e.g., the deponent was less sure or less believable in giving this particular response than he or she was about a normal response during this testimony (or past testimony).

As may be understood, such indications of potentially-relevant non-verbal cues may be initially determined and tagged through a computerized and/or automated process, and then may be modified, increased in duration/line rage, deleted, etc., manually by one or more of the participants reviewing the testimony transcript (e.g., from among the various participants whose roles were described above with reference to FIG. 2). In other embodiments, indications of potentially-relevant non-verbal cues may be tagged manually in the first instance by one or more of the participants reviewing the testimony transcript. In some embodiments, such manual taggings could also be used to further train the system's AI-based systems for recognizing particular non-verbal cues, e.g., by providing 'expert-vetted' examples of the particular non-verbal cues identified, upon which the AI-based systems could update their existing models and/or frameworks. This so-called human-in-the-loop (HITL) style of system not only improves accuracy within the current manuscript, but also helps train the system, allowing future transcripts to be tagged with improved accuracy and better auto-tagging functionality.

Figure 3C:
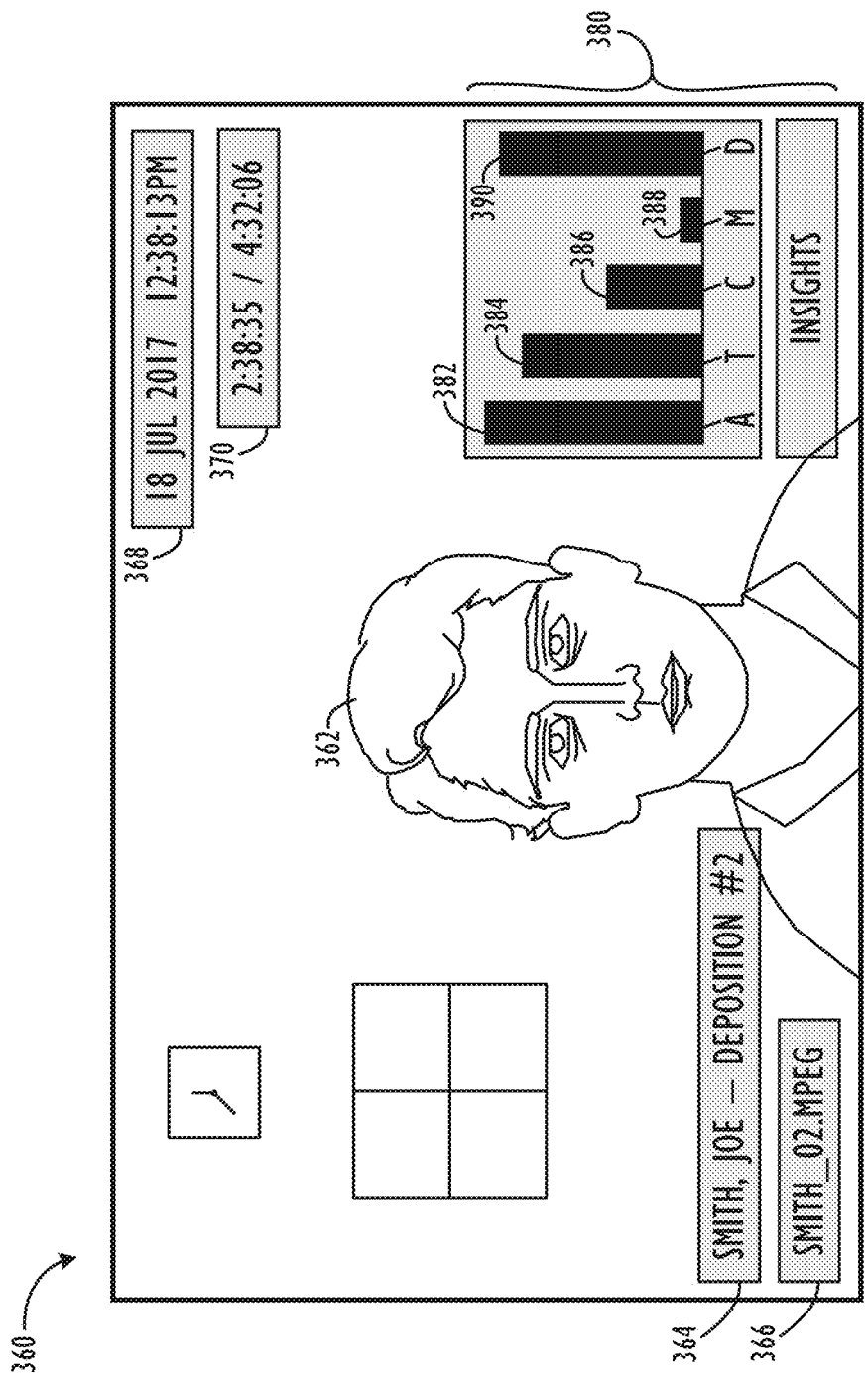
FIG. 3C shows an example of improved insights and annotations to a frame of video from a recorded testimony, according to one or more disclosed embodiments.

Referring now to FIG. 3C, an example 360 of improved insights and annotations to a frame of video from a recorded testimony is shown, according to one or more disclosed embodiments. As illustrated in FIG. 3C, a frame of video from a recorded testimony may already comprise one or more visual and/or metadata indications, e.g.: a video label (364); a file name indication (366); a date/time indicator (368); and/or a timestamp indicator (370) indicating where within the recorded testimony the displayed frame is located.

As discussed above, according to some embodiments, additional insights and annotations of non-verbal cues recognized in the video file may also be annotated in a visual fashion so that a viewer of the video file may be aware when such non-verbal cues are present in the video. One example of a graphical element for displaying such non-verbal insights during the playback of video testimony is shown in frame overlay 380. Exemplary frame overlay 380 shows the relative sensed amounts of various non-verbal cues in the given video frame currently displayed. For example, bar 382 may represent a present amount of (A)nger observed in the deponent, bar 384 may represent a present amount of (T)ruthfulness/believability observed in the deponent, bar 386 may represent a present amount of (C)onfidence observed in the deponent, bar 388 may represent a present amount of (M)ovement/fidgeting observed in the deponent, and bar 390 may represent a present amount of (D)elay between the ending of the last posed question and the beginning of the deponent's response.

By watching the fluctuations and relative changes in the amounts of the various recognized non-verbal cues, an attorney reviewing the video testimony file may be able to more quickly identify or pay closer attention to portions of the testimony that may be of particular relevance. The information presented in video frame overlay 380 may be encoded on top of each individual frame of video in the final produced video (e.g., by producer 208 in the example of FIG. 2), or the information reflecting the recognized non-verbal cues may be encoded into a separate file, e.g., that is the same length as the video file, which may be played back separately from the video content of the testimony, in a separate window (but displayed concurrently with) the video content of the testimony, or customized into any presentation format desired by a client. Additionally, such labeling may improve the productivity of consumers of such transcript files, allowing them to quickly navigate between "sections of interest" in the testimony, e.g., as tagged by such attributes/insights. It is to be understood that the particular insights shown in the example 360 are merely exemplary, and the particular non-verbal cues that a given implementation may be trained to recognize and/or for which a client may wish to have provided in the finished transcript product may vary on a customized, i.e., case-by-case basis.

Figure 4:
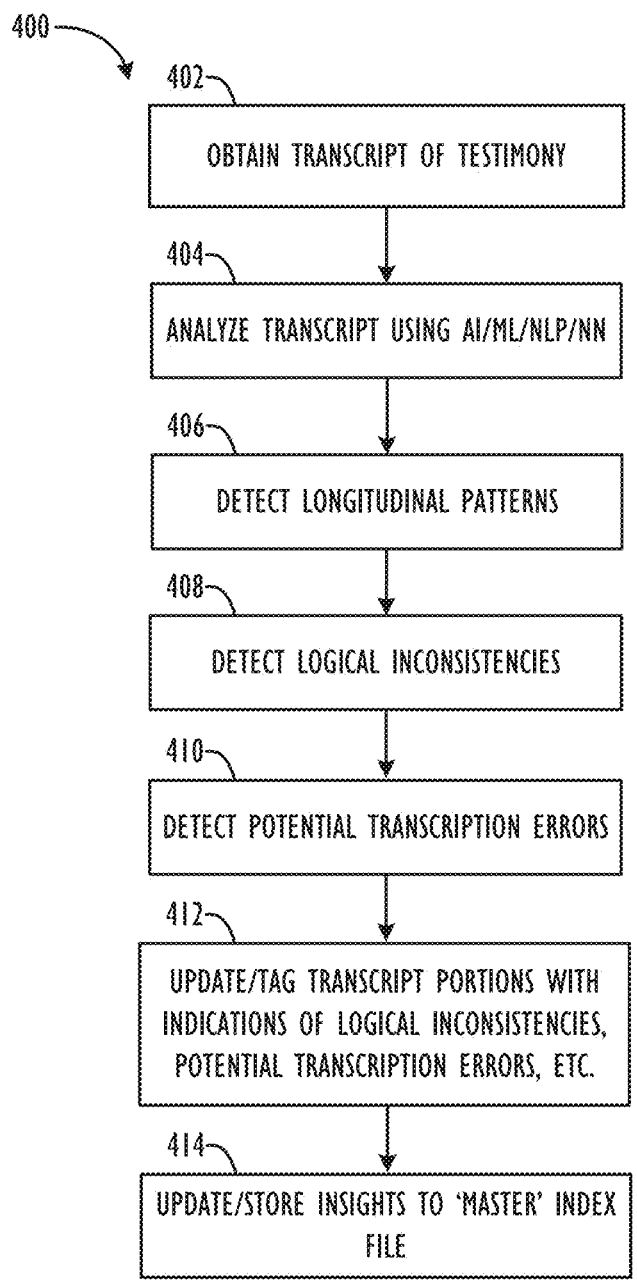
FIG. 4 is a flowchart showing a method for providing testimony-specific AI-based insights and annotations to a testimony transcript, according to one or more disclosed embodiments.

Referring now to FIG. 4, a flowchart 400 showing a method for providing testimony-specific AI-based insights and annotations to a testimony transcript is shown, according to one or more disclosed embodiments. First, the method may obtain a transcript of a testimony (Step 402). Next, the method may analyze the obtained transcript using one or more AI-enabled techniques, e.g., machine learning, natural language processing, and/or the output of neural networks (Step 404). In some embodiments, the method may also attempt to identify longitudinal patterns in the testimony, e.g., by comparing the testimony in the obtained transcript to other testimony given by the same witness at different points in time (Step 406). This longitudinal analysis may reveal certain expressions or preferred terms used by the testifying party, and/or past answers the testifying party has given to the same or similar questions. Further, through such automated analysis, the system may develop customized ontologies by speaker, company, topic, etc., thereby enabling the quantification and annotation of relationships between such entities dynamically. Next, the method may detect logical inconsistencies in the obtained transcript, e.g., based on the aforementioned analysis of the obtained transcript using AI-enabled techniques (Step 408). For example, if a deponent gave answers determined to have semantically different meanings to two or more questions determined to have semantically the same meaning (e.g., at multiple points during the same testimony, or at different times in different testimonies), such moments could be detected and tagged. Using the aforementioned analysis from Steps 404/406, the process may next attempt to detect potential transcription errors (Step 410). For example, natural language processing may determine that a response of "I wonder cans." makes less semantic sense in a given context than a response of "I understand," and thus could be detected and tagged as a potential ASR transcription error based on the context and/or the extracted subject(s) of the testimony. For example, while the raw ASR transcript for a given testimony may return the words "cans her" in various places, because of prior knowledge the system has obtained, e.g., based on the extracted topic(s) of the transcript (and/or related previous transcripts), e.g., which may relate to medical testimony, the DCR system could correct the transcription of the words "cans her" to the contextually more likely, "cancer" in real-time or near real-time (or in post-processing). Next, the process may update and/or tag the relevant portions of the transcripts with indications of the corresponding identified logical inconsistences and/or transcription errors (Step 412). The tagging process may comprise adding the tag into a metadata portion of the transcript document, and/or making a visual annotation directly into the transcript document (e.g., via bolding, underlining, highlighting, annotation, overlay, or other emphasis techniques). Finally, to the extent any of the updated and/or tagged portions of the transcript document are also reflected, in whole or in part, in a 'master index file' (i.e., a file that correlates similar responses to similar questions across multiple deponents and/or multiple testimony settings, e.g., to aid in attorney review over the course of a large litigation), the corresponding portions of the master index file may also be the updated and/or tagged accordingly to reflect the identified logical inconsistences and transcription errors (Step 414).

Figure 5:
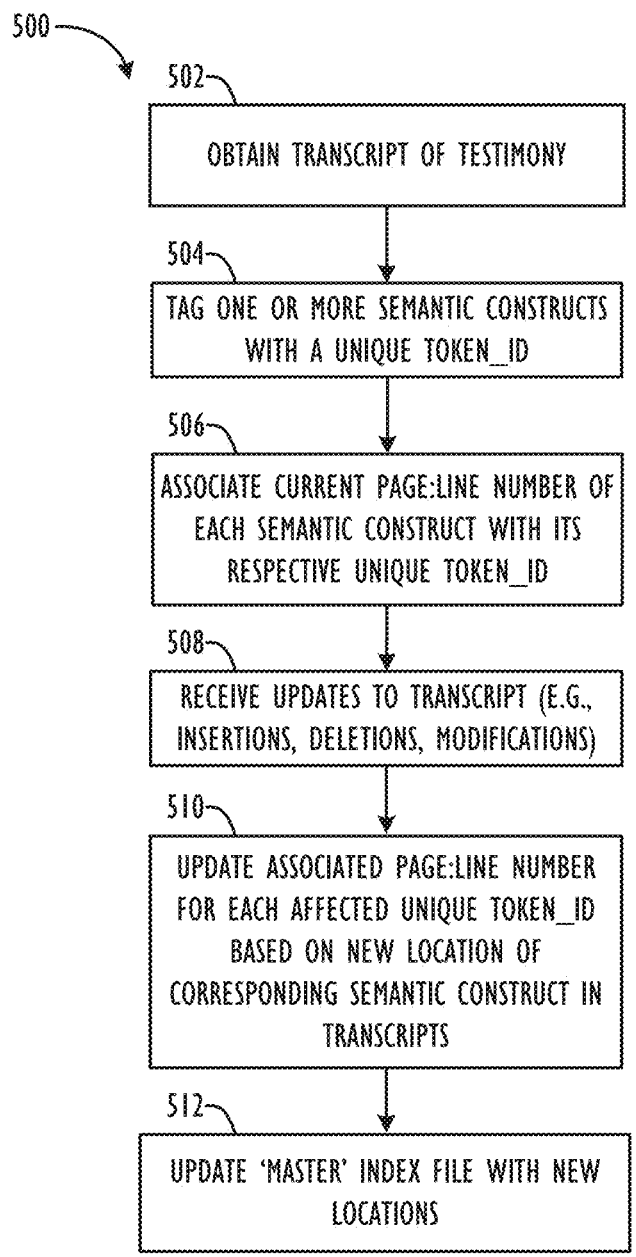
FIG. 5 is a flowchart showing a method for providing smart citations to a testimony transcript, according to one or more disclosed embodiments.

Referring now to FIG. 5, a flowchart 500 showing a method for providing smart citations to a testimony transcript is shown, according to one or more disclosed embodiments. First, the method may obtain a transcript of a testimony (Step 502). Next, the method may tag one or more semantic constructs with a unique Token_ID (Step 504). For the purposes herein, a semantic construct may be considered some portion of a transcript, e.g., a word, phrase, sentence, paragraph, question, answer, etc., that the digital court reporting system wishes to track over time, e.g., as the transcript document is modified from its initial rough or raw draft state. Next, the method may associate current page and line number ranges with the tagged one or more semantic constructs (Step 506). For example, a semantic construct may be identified for the phrase, "I understand." This semantic construct may be assigned the unique Token_ID: "123456," and may be associated with a page/line range of "Page 2: Line 95—Page 2: Line 95" (as shown, e.g., in FIG. 3B). It is to be understood that semantic constructs may span multiple lines and multiple pages in certain instances. Moreover, various semantic constructs may be at least partially overlapping. For example, the semantic construct identified for the phrase, "All right, sir? A: I understand." may be assigned a different unique Token_ID: "567890," and may be associated with a page/line range of "Page 2: Line 94—Page 2: Line 95."

Next, the method may receive updates to the transcript, e.g., in the form of insertions, deletions, and/or modifications received from one or more parties with access to and authority to make modifications to the transcript (Step 508). In response to the received updates, the method may then update the associated page/line ranges for the various identified semantic constructs within the transcript file. As may be understood, a given modification to a transcript document may affect only a single semantic construct's page/line range, or the given modification may affect up to all of the identified semantic constructs' page/line ranges for a given transcript file. As may now be understood, by tracking the changing location of various semantic constructs within the transcript throughout the various phrases of the transcript editing process, important annotations, highlights, query results, etc., may be updated in the appropriate fashion, i.e., so that they are still tied to the correct portion of the transcript document as subsequent changes are made to the transcript file. In some instances, modifications to the transcript file may result in the deletion of a semantic construct or the splitting of a semantic construct into two or more new semantic constructs. The creation of new semantic construct Token_IDs may necessitate an updating operation to historically stored Token_ID references that may no longer exist in the transcript. The design enables flexibility, e.g., allowing a human operator to override any auto-assigned speaker, text or attribute in the original transcript. Finally, to the extent any of the updated and/or tagged semantic constructs in the transcript document are also reflected, in whole or in part, in a master index file, the corresponding portions of the master index file may also be the updated accordingly to reflect the updated page/line range associations with the various affected Token_IDs (Step 512).

Figure 6:
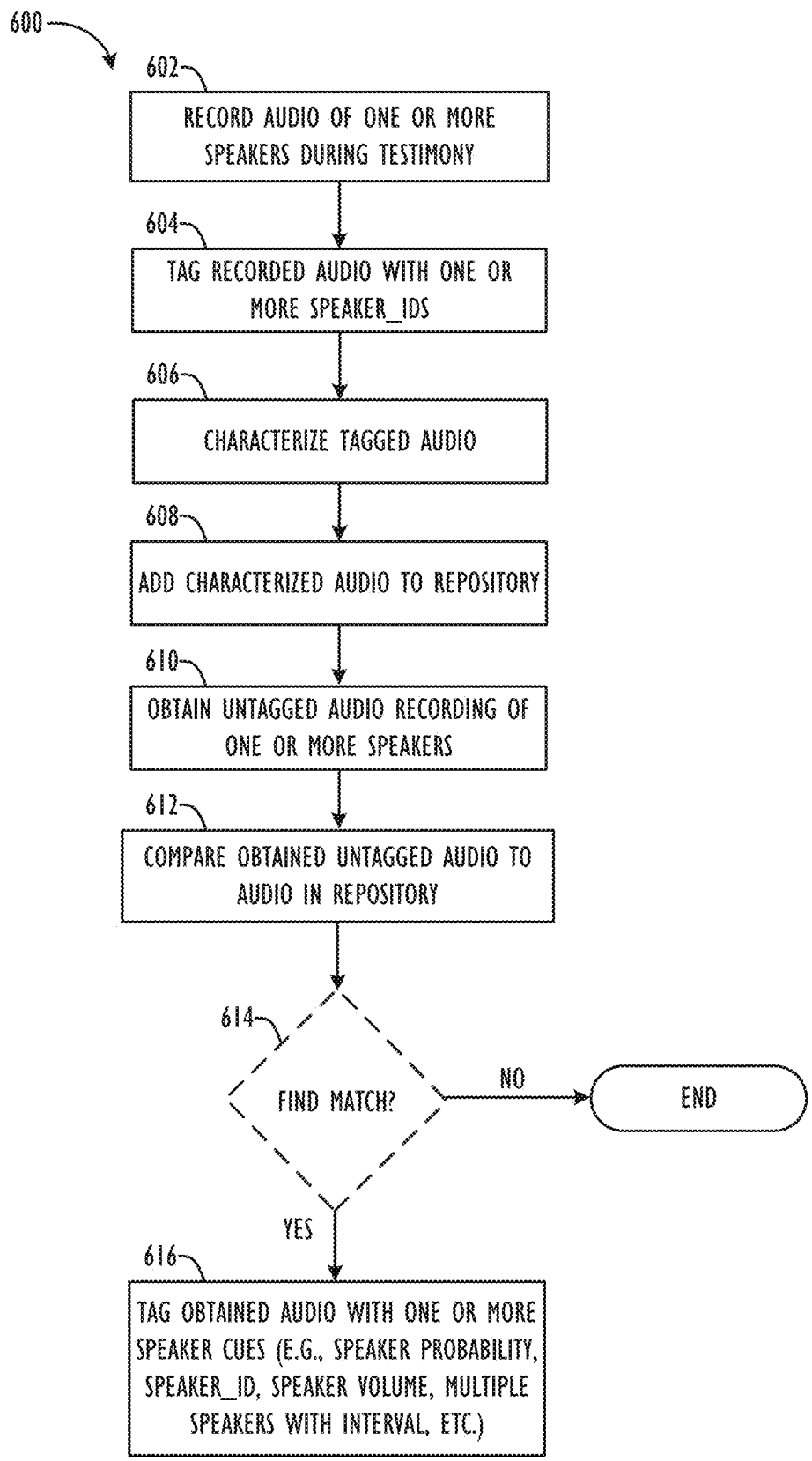
FIG. 6 is a flowchart showing a method for providing intelligent speaker identification-related insights and annotations to an audio (or audiovisual) recording of a testimony transcript, according to one or more disclosed embodiments.

Referring now to FIG. 6, a flowchart 600 showing a method for providing intelligent speaker identification-related insights and annotations to an audio (or audiovisual) recording of a testimony transcript is shown, according to one or more disclosed embodiments. First, the method may obtain recorded audio of one or more speakers during testimony (Step 602). Next, the method may tag one or more portions of the obtained recorded audio with one or more unique Speaker_IDs (Step 604), e.g., based on knowledge of who was speaking during the corresponding portion of the testimony. In some cases, a human operator (e.g., either in the room where the testimony is taking place or with remote video access to the proceedings) may tag the testimony with Speaker_IDs in real-time or near real-time. In other embodiments, the tagging of Speaker_IDs may be aided by automated voice and/or face recognition software and/or knowledge of the line levels of the various audio channels, e.g., in instances where particular audio channels are assigned to particular speakers during the testimony. Next, the method may characterize the tagged audio (Step 606). Characterizing the tagged audio may involve performing one or more operations to understand the meaning, intent, source(s), and/or content of the tagged audio. In some embodiments, characterizing the tagged audio may comprise converting the audio/speech data into textual form. In some instances, this may be performed by a human typist, e.g., a trained court reporter. In other instances, however, the conversion of the audio/speech data into textual form may be performed by computerized or other automated modalities.

Human speech that is to be transcribed into textual form may typically fall into one of three main scenarios: 1.) Human-to-Machine Applied Speech: In these utterance scenarios (e.g., a human user interacting verbally with a phone, car, or other device with a limited set of key intents that need to be recognized), the human user generally knows they are interacting with a machine and trying to get it to do something specific. The user may even limit their speech patterns to include simple phrases or commands that they know the machine is capable of responding to. 2.) Human-to-Machine General Speech: In these utterance or dictation scenarios, a human user typically knows that they are talking to a machine, may even be shown the results of the machines' speech-to-text recognition on a display in real-time, and may carefully plan their commands, use more formalized language, clearer diction, and employ full sentences that last less than 10 seconds long. An example of this type of scenario is dictating a text message to a mobile phone. 3.) Human-to-Human General Speech: In typical conversation scenarios, users are engaged in a human-to-human conversation, wherein multiple users may be speaking, may be overlapping each other in speech, may be speaking at different rates, and/or with different diction clarity levels, etc. This is the hardest scenario in which to perform speech-to-text recognition, and it also approximates the situation in a legal deposition or other testimony environment the most closely.

As such, when performing or attempting to perform speech-to-text recognition in human-to-human scenarios, it is preferable to not use compressed audio formats (e.g., mp3, mpeg, aac, etc.). Instead, it is preferable to use lossless encoding, e.g., in the .wav format (e.g., Linear16 and/or Linear PCM) or in the lossless .flac file format. It may further be preferable to capture the audio at a sampling rate of at least 44 kHz and not re-encoding the audio. For example, taking an mp3 recording and re-encoding it into wav/flac may present worse results that simply using the mp3 source recording. It is also preferable to ensure that every processing step performed on the audio file is also lossless, to the extent possible. For example, sometimes, merely trimming the start and/or end times of an audio file may cause a re-encoding of the audio and thus decrease the quality—without the user realizing it. Finally, it may be preferable to record single channel audio (as opposed to stereo audio), at least because most transcription APIs require stereo audio channels to be combined into a single channel before transcription, which, as mentioned above, may lead to further degradations in quality of the audio if the channels have to be combined in post-processing to be submitted to the transcription API.

Returning now to FIG. 6, once the tagged audio has been characterized, e.g., with the meaning, intent, source(s), and/or content of the respective audio, it may be added to an audio repository (Step 608), e.g., an audio repository maintained by the digital court reporting system. Such audio files may be stored locally at a user's computing device and/or stored and accessed via a remote server, e.g., a cloud storage service provider.

Next, e.g., at a later time, incoming untagged audio recordings of one or more speakers may be obtained by the digital court reporting system (Step 610). The obtained untagged audio recordings may then be compared with audio stored in the aforementioned audio repository (Step 612). If no match is found in the audio repository, e.g., a match between a voice present in the incoming untagged audio recording and a voice in one or more of the tagged audio recordings in the audio repository (i.e., "NO" at Step 614), then the method 600 may end, as it is unlikely that the audio repository would be able to contribute additional useful information regarding the current incoming untagged audio recording. If, instead, a match is found between a voice present in the incoming untagged audio recording and a voice in one or more of the tagged audio recordings in the audio repository (i.e., "YES" at Step 614), then the method 600 may proceed to Step 616 and tag the obtained incoming untagged audio with one or more speaker cues gleaned from the matching audio recordings in the audio repository. For example, in some embodiments, the tagged speaker cues may comprise: a speaker probability value for a given recognized voice in the incoming audio recording; a Speaker_ID value for given recognized voice in the incoming audio recording; a speaker volume indication (e.g., a relative volume level of a deponent in a current recording as compared to previous recordings of the deponent); an indication that multiple speakers are likely overlapping each other during a given time interval, etc. Further, based on the matching content identified in the repository, the user may be given the option to download or playback the matching content, or be prompted with options to download or playback other relevant material, for example other experts/expert testimony on the same topics and/or previous testimony by the same (or related) deponents, etc.

Exemplary Processing Device

Figure 7A:
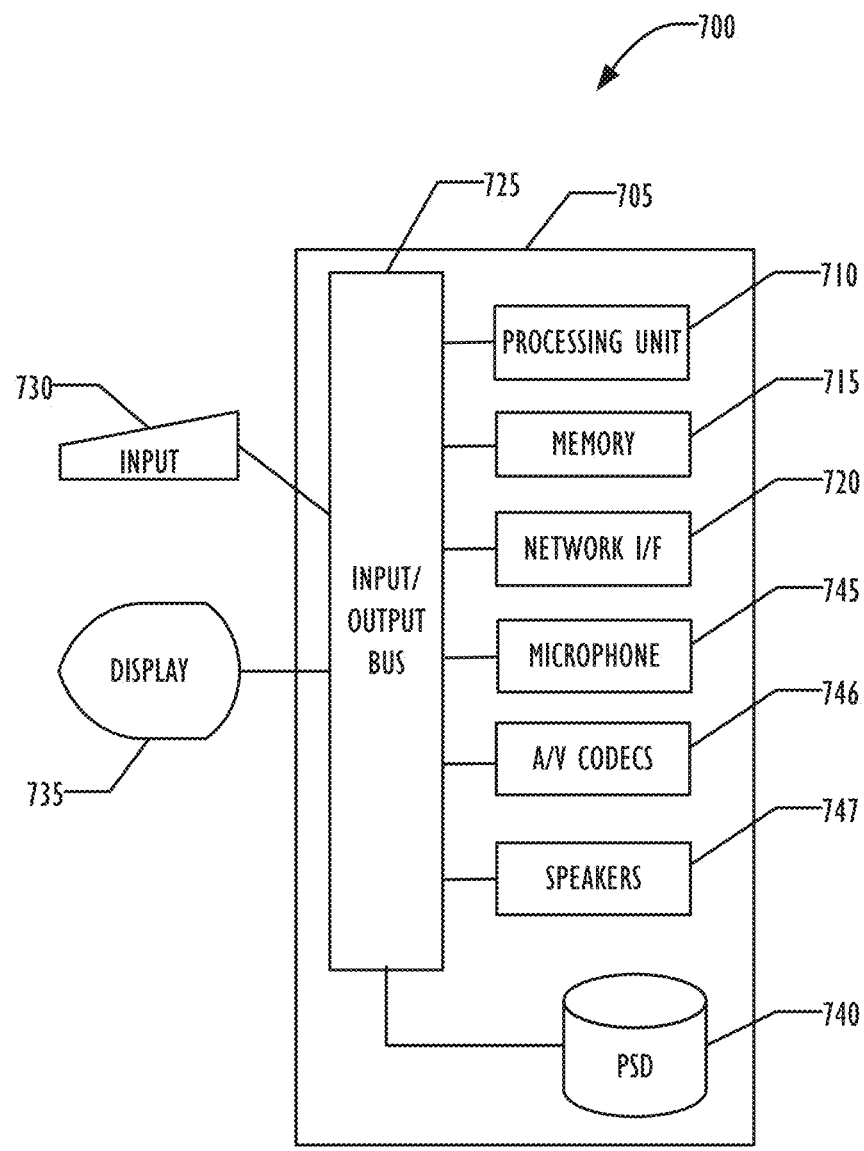
FIG. 7A is a block diagram illustrating a computer that could be used to execute the techniques described herein, according to one or more of disclosed embodiments.

Referring now to FIG. 7A, an example processing device 700 for use in the digital court reporting systems described herein, according to one or more embodiments, is illustrated in block diagram form. It is to be understood that, in a given embodiment, the processing device used in the digital court reporting system may be present in the location where the testimony is being delivered, or could exist in one or more locations remote to the location where the testimony is being delivered. Processing device 700 may take the form of, e.g., a mobile phone, laptop computer, desktop computer, etc. Example processing device 700 comprises a system unit 705 which may be optionally connected to an input device 730 (e.g., keyboard, mouse, touch screen, etc.) and display 735. A program storage device (PSD) 740 (sometimes referred to as a hard disk, hard drive, storage, flash memory, or non-transitory computer readable medium) is included within the system unit 705. Also included with system unit 705 may be a network interface 720 for communication via a network (either cellular or computer) with other devices and/or services (not shown). Network interface 720 may be included within system unit 705 or may be external to system unit 705. In either case, system unit 705 will be communicatively coupled to network interface 720. Program storage device 740 represents any form of non-volatile storage including, but not limited to, all forms of optical and magnetic memory, including solid-state storage elements, including removable media, and may be included within system unit 705 or be external to system unit 705. Program storage device 740 may be used for storage of software to control system unit 705, data for use by the processing device 700, or both.

System unit 705 may be programmed to perform methods in accordance with this disclosure. System unit 705 comprises one or more processing units, input-output (I/O) bus 725 and memory 715. Access to memory 715 can be accomplished using the communication bus 725. Processing unit 710 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 715 may include one or more memory modules and comprise random access memory (RAM), read only memory (ROM), programmable read only memory (PROM), programmable read-write memory, and solid-state memory. As also shown in FIG. 7A, system unit 705 may also include one or more microphones 745, which may be external to system unit 705, one or more audio and/or visual codecs 746, and one or more speakers 747, which may be internal or external to system unit 705.

Figure 7B:
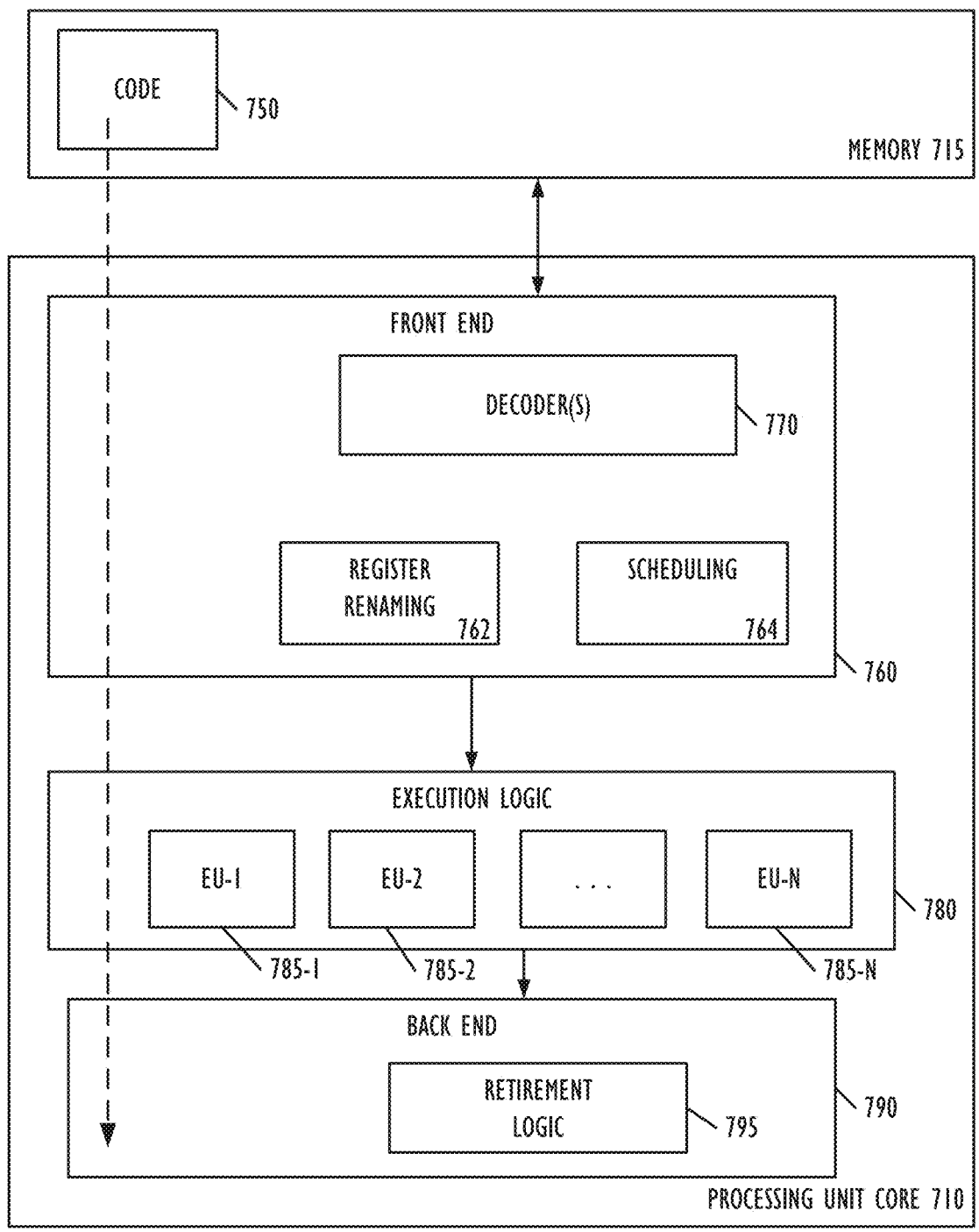
FIG. 7B is a block diagram illustrating a processor core, which may reside on a computer according to one or more of disclosed embodiments.

Referring now to FIG. 7B, a processing unit core 710 is illustrated in further detail, according to one embodiment. Processing unit core 710 may be the core for any type of processor, such as a micro-processor, an embedded processor, a digital signal processor (DSP), a network processor, or other device to execute code. Although only one processing unit core 710 is illustrated in FIG. 7B, a processing element may alternatively include more than one of the processing unit core 710 illustrated in FIG. 7B. Processing unit core 710 may be a single-threaded core or, for at least one embodiment, the processing unit core 710 may be multithreaded, in that, it may include more than one hardware thread context (or "logical processor") per core.

FIG. 7B also illustrates a memory 715 coupled to the processing unit core 710. The memory 715 may be any of a wide variety of memories (including various layers of memory hierarchy), as are known or otherwise available to those of skill in the art. The memory 715 may include one or more code instruction(s) 750 to be executed by the processing unit core 710. The processing unit core 710 follows a program sequence of instructions indicated by the code 750. Each instruction enters a front end portion 760 and is processed by one or more decoders 770. The decoder may generate as its output a micro operation such as a fixed width micro operation in a predefined format, or may generate other instructions, microinstructions, or control signals which reflect the original code instruction. The front end 760 may also include register renaming logic 762 and scheduling logic 764, which generally allocate resources and queue the operation corresponding to the convert instruction for execution.

The processing unit core 710 is shown including execution logic 780 having a set of execution units 785-1 through 785-N. Some embodiments may include a number of execution units dedicated to specific functions or sets of functions. Other embodiments may include only one execution unit or one execution unit that can perform a particular function. The execution logic 780 performs the operations specified by code instructions.

After completion of execution of the operations specified by the code instructions, back end logic 790 retires the instructions of the code 750. In one embodiment, the processing unit core 710 allows out of order execution but requires in order retirement of instructions. Retirement logic 795 may take a variety of forms as known to those of skill in the art (e.g., re-order buffers or the like). In this manner, the processing unit core 710 is transformed during execution of the code 750, at least in terms of the output generated by the decoder, the hardware registers and tables utilized by the register renaming logic 762, and any registers (not shown) modified by the execution logic 780.

Although not illustrated in FIG. 7B, a processing element may include other elements on chip with the processing unit core 710. For example, a processing element may include memory control logic along with the processing unit core 710. The processing element may include I/O control logic and/or may include I/O control logic integrated with memory control logic. The processing element may also include one or more caches.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:
1. A method, comprising:
obtaining a video recording of a testimony given by a first deponent;
obtaining a transcript of the testimony;
scanning the video recording to locate one or more emotional cues and non-verbal cues;

linking the located one or more emotional cues and non-verbal cues to corresponding portions of the transcript;

updating the corresponding portions of the transcript with indications of the corresponding located one or more emotional cues and non-verbal cues;

updating the corresponding portions of the video recording with indications of the corresponding located one or more emotional cues and non-verbal cues, wherein:

at least one of the indications comprises a graphical overlay on a frame of the video recording visible during playback of the video recording;

the graphical overlay includes a visual indicator displaying derived insights corresponding to the located one or more emotional cues and non-verbal cues, wherein the derived insights comprise a bar graph depicting an amount of the one or more emotional cues and non-verbal cues; and playing the video recording with the graphical overlay.

2. The method of claim 1, wherein the located one or more emotional cues and non-verbal cues comprise at least one of the following: speech patterns, stress levels, response delay amounts, and movement anomalies.

3. The method of claim 1, further comprising:

comparing the transcript to a different point in time in the transcript of the first deponent or to one or more additional transcripts given by the first deponent, wherein comparing the transcript includes correlating the located one or more emotional cues and non-verbal cues to a corresponding portion at the different point in time in the transcript of the first deponent or to corresponding portions of the one or more additional transcripts given by the first deponent.

4. The method of claim 1, wherein the updating includes adding the indication to a page and line number of the transcript corresponding to the located one or more emotional cues and non-verbal cues.

5. The method of claim 1, wherein the updating further includes detecting and tagging logical inconsistencies in the transcript as determined by a trained machine learning model.

6. The method of claim 1, further comprising:

scanning the transcript to identify a semantic construct, wherein the semantic construct includes one or more words for tracking;

associating the semantic construct with a unique identifier; and associating a page and line number in the transcript with the semantic construct and the unique identifier.

7. The method of claim 6, wherein the semantic construct includes a word, a phrase, a sentence, a paragraph, a question, or an answer.

8. The method of claim 6, further comprising:

automatically updating the page and line number associated with the semantic construct and the unique identifier on a condition that the transcript is updated.

9. The method of claim 8, further comprising:

splitting the semantic construct into two or more new semantic constructs based on updates to the transcript;

updating the unique identifier associated with the semantic construct, wherein the updating includes creating new unique identifiers for each of the new semantic constructs.

10. The method of claim 9, wherein updating the unique identifier further includes deleting the unique identifier for the semantic construct on a condition that the semantic construct is no longer used.

11. The method of claim 1, wherein the located one or more emotional cues and non-verbal cues comprise anger, truthfulness, confidence, movement, or delay.

12. A non-transitory program storage device comprising instructions stored thereon to cause one or more processors to:

obtain a video recording of a testimony given by a first deponent;

obtain a transcript of the testimony;

scan the video recording to locate one or more emotional cues and non-verbal cues;

link the located one or more emotional cues and non-verbal cues to corresponding portions of the transcript;

update the corresponding portions of the transcript with indications of the corresponding located one or more emotional cues and non-verbal cues;

update the corresponding portions of the video recording with indications of the corresponding located one or more emotional cues and non-verbal cues, wherein:

at least one of the indications comprises a graphical overlay on a frame of the video recording visible during playback of the video recording;

the graphical overlay includes a visual indicator displaying derived insights corresponding to the located one or more emotional cues and non-verbal cues, wherein the derived insights comprise a bar graph depicting an amount of the one or more emotional cues and non-verbal cues; and playing the video recording with the graphical overlay.

13. The non-transitory program storage device of claim 12, wherein the located one or more emotional cues and non-verbal cues comprise at least one of the following: speech patterns, stress levels, response delay amounts, and movement anomalies.

14. The non-transitory program storage device of claim 12, wherein the instructions further comprise instructions to cause the one or more processors to:

comparing the transcript to a different point in time in the transcript of the first deponent or to one or more additional transcripts given by the first deponent, wherein comparing the transcript includes correlating the located one or more emotional cues and non-verbal cues to a corresponding portion at the different point in time in the transcript of the first deponent or to corresponding portions of the one or more additional transcripts given by the first deponent.

15. A device, comprising:

a memory;

a display;

a user interface; and one or more processors operatively coupled to the memory, wherein the one or more processors are configured to execute instructions causing the one or more processors to:

obtain a video recording of a testimony given by a first deponent;

obtain a transcript of the testimony;

scan the video recording to locate one or more emotional cues and nonverbal cues;

link the located one or more emotional cues and non-verbal cues to corresponding portions of the transcript;

update the corresponding portions of the transcript with indications of the corresponding located one or more emotional cues and non-verbal cues;

update the corresponding portions of the video recording with indications of the corresponding located one or more emotional cues and non-verbal cues, wherein:
   at least one of the indications comprises a graphical overlay on a frame of the video recording visible during playback of the video recording;
   the graphical overlay includes a visual indicator displaying derived insights corresponding to the located one or more emotional cues and non-verbal cues, wherein the derived insights comprise a bar graph depicting an amount of the one or more emotional cues and non-verbal cues; and
playing the video recording with the graphical overlay.

16. The device of claim 15, wherein the located one or more emotional cues and non-verbal cues comprise at least one of the following: speech patterns, stress levels, response delay amounts, and movement anomalies.

17. The device of claim 15, wherein the instructions further comprise instructions to cause the one or more processors to:
   compare the transcript to a different point in time in the transcript of the first deponent or to one or more additional transcripts given by the first deponent, wherein comparing the transcript includes correlating the located one or more emotional cues and non-verbal cues to a corresponding portion at the different point in time in the transcript of the first deponent or to corresponding portions of the one or more additional transcripts given by the first deponent.

* * * * *